INVENTOR.
KENICHI TASHIRO
HIROKAZU TANAKA
BY Stanley Wolder
ATTORNEY

INVENTOR.
KENICHI TASHIRO
HIROKAZU TANAKA
BY Stanley Wolder
ATTORNEY

United States Patent Office 3,521,962
Patented July 28, 1970

3,521,962
LIGHT RESPONSIVE AND MEASURING DEVICE
Kenichi Tashiro and Hirokazu Tanaka, Tokyo-to, Japan, assignors to Stanley Denki Kabushiki Kaisha, Tokyo-to, Japan, a corporation of Japan
Filed June 19, 1964, Ser. No. 376,477
Int. Cl. G01j 1/42, 1/46
U.S. Cl. 356—222                                     8 Claims

ABSTRACT OF THE DISCLOSURE

A light measuring system includes at least a pair of series connected photoconductors of different characteristics connected through a current meter to a battery, one of the photoconductors being resistor shunted, the photoconductors facing a common direction and being exposed to different angular fields so that the overall response is optimumly related to the measured light to compensate for counter-light conditions. The plurality of photoconductors is formed as a unit including a plurality of spaced concentric electrodes engaging the corresponding contiguous edges of respective intermediate photoconductive elements, the assembly being positioned on a common base.

---

The present invention relates generally to improvements in light responsive and light measuring devices and it relates particularly to a light measuring system which is compensated to provide a desirable response characteristic for different and widely varying light conditions and is highly suitable for photographic purposes.

In the accompanying drawings which illustrate preferred embodiments of the present invention:

FIG. 2 is a circuit diagram of a conventional compensated light measuring arrangement employing a light receiving photoconductive element made of cadmium sulfide or the like;

It is comparatively simple to carry out exposure value measurement and automatic exposure setting in accordance with such measured value under normal photographic conditions. Under counter-light photographic conditions, however, the application of such average illumination measurement methods as under normal light condition result in under-exposure. Such defective results are apparent not only in photography in which the light image sensitizes the emulsion but also in television camera operation where the image is electrically transduced.

Figure 1:
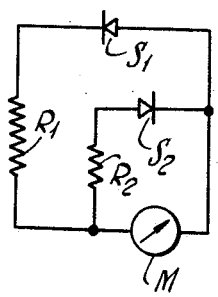
FIG. 1 is a circuit diagram of a conventional arrangement utilizing photocurrent generating devices such as selenium photocells, etc.

In order to automatically compensate such excessive indication or setting of the light measurement means which is inevitably produced under counter-light or back lighting photographing conditions, that is where the subject is highly illuminated by light from the rear of the subject relative to the camera it has been proposed and practiced to some extent to utilize a circuit which is essentially shown in FIG. 1 as a light measurement compensating arrangement comprising photocurrent generating element such as selenium photocell. In this arrangement, two selenium photocells $S_1$ and $S_2$ of different light receiving areas are provided. The photocell $S_1$ of large light receiving area is connected to an indicating meter M in the same manner as in the normal reflection meaurement method, while the photocell $S_2$ of small light receiving area has a large light received angle of the incident ray measurement method. In order to compensate the indication accuracy when intense direct light rays impinge, with the photocells connected in different polarity from each other, resistors $R_1$ and $R_2$ of suitably selected values are respectively provided in series connection so that under-exposure due to excessive meter indication under counter-light conditions can be avoided.

It is clear that such system cannot be applied to the arrangement utilizing not photocurrent generating elements but photoconductive elements such as cadmium sulfide, cadmium selenide, etc. When a photoconductor is utilized as a light receiving element for indicating photographic exposure value, the situation is different from that of other meters such as illuminometers. That is, the indicated value must correspond to light intensity variation of geometric series with the common ratio of 2 whereby each doubling of the light intensity provides a unit increment increase in the indicated value or measurement, so that compensation of the light response characteristic is highly difficult. The brightness resistance characteristic of the conventional photoconductor consisting of cadmium sulfide, cadmium selenide, etc. is as shown by the curve A of FIG. 3. In connection with this characteristic it can be said that in response to brightness variation in the manner of geometric series, the resistance value also varies in the manner of geometric series, the two variations being in logarithmic relation with each other. Therefore, when an ammeter is used which is provided with uniform magnetic field or with very slightly compensated magnetic field which is almost uniform, the indicating pointer deflection angle variation in response to brightness geometric series variation is also in the manner of geometric series, so that the scale graduation is not uniformly spaced and wide brightness range indication cannot be made within a certain pointer deflection range.

Figure 2:
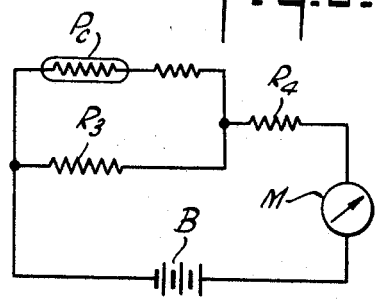
Figure 4:
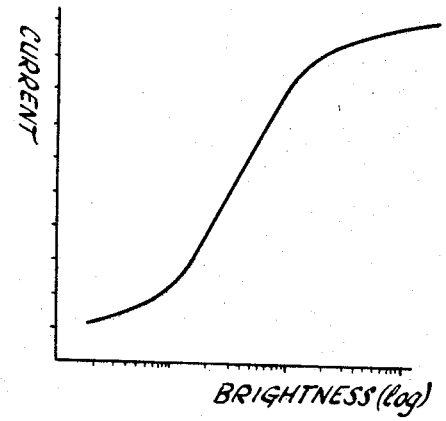
FIG. 4 is a graph showing the measured current characteristic relative to photographic geometric series light amount, which characteristic corresponds to the characteristic shown in FIG. 3.

In order to compensate such phenomenon it has been common practice to provide a compensating circuit as shown in FIG. 2 in which a fixed resistor $R_3$ which does not change its value in response to brightness variation is connected in parallel with a photoconductor PC to define a shunt. Accordingly, when the brightness is low, the current intensity (power source: battery B) through the ammeter is increased, and when brightness is high the current intensity which of necessity increases is suppressed by a resistor $R_4$ in series connection. This resulted in a slight advantage in indication effect, but the current variation in response to geometric series variation of brightness is still such as shown in FIG. 4 which is not satisfactory. According to such compensated circuit characteristic, if the ammeter M is suitably compensated so as to have a deflection angle characteristic such as shown by the solid line of FIG. 5, the indication scale can be of course graduated by proportional uniform spacing in response to geometric series variation of received light brightness. However, such compensation of the ammeter M is technically difficult.

Figure 5:
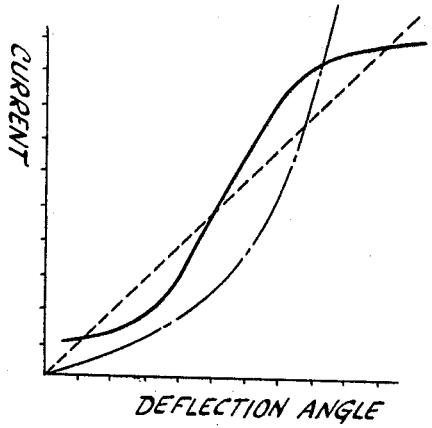
FIG. 5 is a graph showing the pointer deflection angle characteristic of the measured light value indicating ammeter.

If a uniform magnetic field ammeter is utilized having a deflection angle characteristic as shown by the dotted line of FIG. 5, for the aforementioned reason the scale graduation is not uniformly spaced so that measurement accuracy changes with illumination ranges and reading of indicated value becomes very troublesome and human error is apt to be caused in reading.

If an indicating ammeter of non-uniform magnetic field (whose characteristic is such as shown by the dot-and-dash line curve of FIG. 5) is connected to the photoconductor without circuit compensation, it may be considered that approximately uniformly spaced scale graduation be obtained. According to this method, however, the measurement range becomes extremely narrow and measurement cannot be performed for a wide range of brightness variation.

The object of the present invention is to automatically compensate the excessive indication of the light measuring device or automatic setting operation of the camera in response to such indication so that excellent effect can be obtained in the resulting photograph.

Another object of the present invention is to provide a light measuring arrangement comprising light receiving photoconductor elements, such as of cadmium sulfide, cadmium selenide, etc., having a measurement range corresponding to broad brightness variation and having almost uniformly spaced indicating deflection angle scale graduation in relation to variation of received light brightness in the manner of geometric series with the common ratio of 2.

A further object of the present invention is to provide novel light receiving elements adapted for attaining the above objects of the present invention more effectively.

Figure 6:
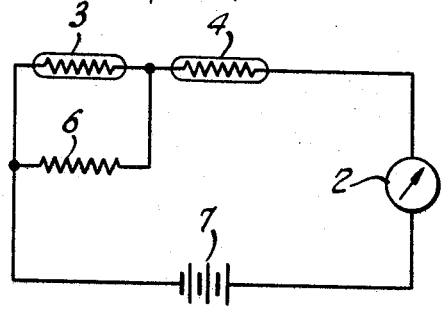
FIGS. 6 and 7 are circuit diagrams of embodiments of arrangements according to the present invention.
Figure 7:
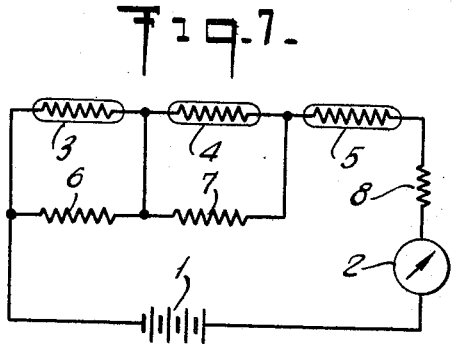

In the arrangement of the present invention as shown in FIGS. 6 and 7, for the above purpose, in the circuit comprising a power source battery 1 and an ammeter or sensitive current meter 2 there are inserted photoconductors, 3, 4 . . . in series connection as light receiving elements, and a resistor is connected in parallel with one of or each of more than two of such photoconductors. In the example as shown in FIG. 6, a single resistor 6 is connected in parallel with the photoconductor 3 to define a shunt, and in another example as shown in FIG. 7 three photoconductors 3, 4 and 5 are connected in series with each other and resistors 6a and 7 are connected in series with photoconductors 3 and 4 respectively. In practice variable resistors may be utilized for such resistors so as to be adjustable upon inspection of the operation of the arrangement. Another resistor 8 is provided for compensating the indicated value.

If it is assumed that in the circuit as shown in FIG. 6 the photoconductor 4 has a fixed resistance value independent of the brightness, then the resultant resistance due to the photoconductor 3 and the resistor 6 in parallel connection is smaller than the resistance which would appear if the photoconductor 3 alone is inserted in the circuit, so that the current flowing into the ammeter is more intense. The rate of decrease of this resistance is large when the brightness is low and small when the brightness is high. Accordingly, on the assumption that the resistance value of the photoconductor 4 is constant, the resistance variation is shown by the curve B of FIG. 3.

If two or more photoconductors are connected in series with each other as shown in the example of the present invention shown in FIG. 7, the photoconductor $5a$ varies its resistance value in response to received light brightness. This resistance change is great when the brightness is low and small when the brightness is high, so that the resultant resistance variation is such as shown by the curve C of FIG. 3. In this case the current flowing through the ammeter is approximately proportional to the logarithmic variation of the brightness. Accordingly, a uniform magnetic field ammeter or an ammeter compensated so as to have approximately uniform magnetic field is utilized, the characteristic curve is such as shown by the curve $\alpha$ of FIG. 8.

Figure 3:
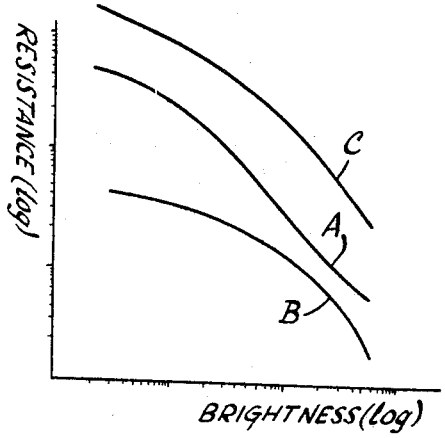
FIG. 3 is a graph showing a characteristic resistance variation of a photoconductive light measuring element in response to brightness variation.
Figure 9:
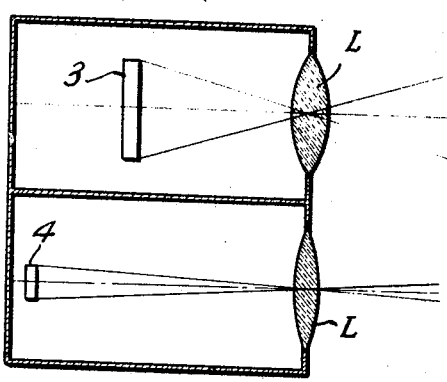
FIGS. 9 and 10 show examples of the light receiving structures of the arrangement according to the present invention.
Figure 10:
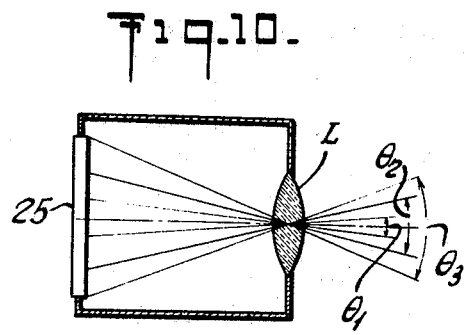

The characteristic curve $\alpha$ in this case does not produce any compensating function in a counter-light photographing. However, as shown in FIGS. 9 and 10, by making the light receiving angle of the photoconductor 4 smaller than that of the photoconductor 3, the resistance value variation of the photoconductor 4 is made substantially duller than that of the photoconductor 3, and further impinging of harmful rays outside the image angle is prevented. As a result, the circuit resistance value at the high brightness side of the curve C of FIG. 3 is increased.

Figure 8:
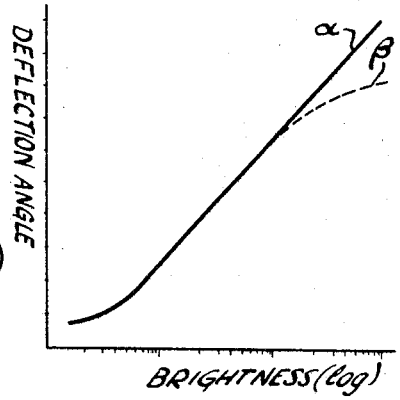
FIG. 8 is a graph showing the characteristic of the pointer deflection angle of the indicating ammeter of the arrangement of the present invention in response to brightness variation.

Thus, when light measurement is made with high brightness that is proper to a counter-light photographing, the ammeter deflection is decreased as shown in the characteristic curve $\beta$ of FIG. 8 so that exposure value according to light measurement indication is increased, and, in automatic setting cameras, the diaphragm aperture or exposure time can be increased. Since such compensation and operation amount may be increased with the height of brightness, the compensation or the resulting operation may be automatically carried out in accordance with the brightness difference between the object to be photographed and the counter-light. As a result, excellent effect is obtained which is adapted for the actual purpose of the photographing.

Figure 11:
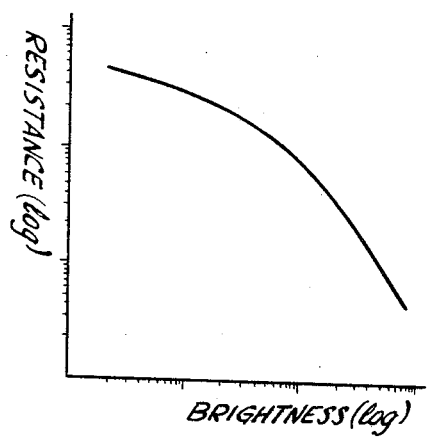
FIG. 11 is a graph showing the brightness resistance characteristic of the resistor of the arrangement acccording to the present invention.
Figure 12:
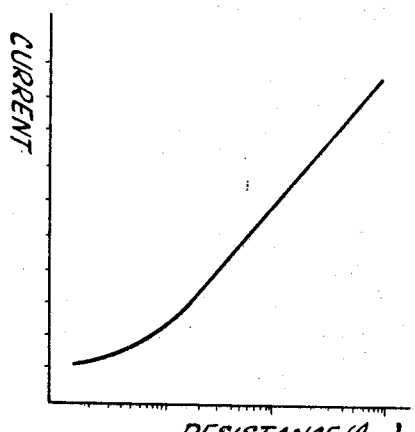
FIG. 12 is a graph showing the resistance-current characteristic of the arrangement according to the present invention.
Figure 13:
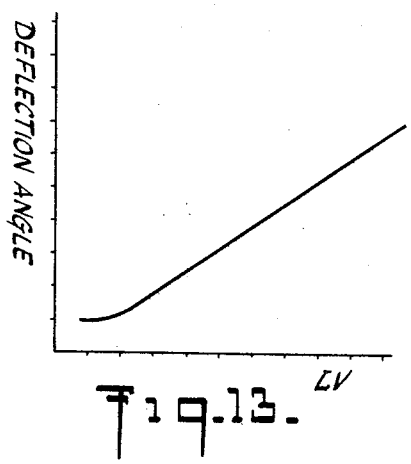
FIG. 13 is a graph showing the measurement characteristic of the arrangement according to the present invention indicating the pointer deflection in response to photographic geometric series light amount.

In such arrangement of the present invention, the lowest brightness current flow due to the circuit resistance resulting from the photoconductor and the resistor in parallel connection is not under the influence of a resistor of constant value and in series connection, but under the influence of the circuit resistance resulting from the photoconductor and the resistor connected in parallel therewith both of which receive light rays of the same brightness. On the other hand, under high brightness condition the current flowing into the ammeter is suppressed not by a constant value resistor in series connection but by complex suppressive action in accordance with the received light brightness. Accordingly, the general characteristic curve indicating the correlation between the resistance value outside the ammeter 2 and the brightness is such as shown by FIG. 11. As a result, by making the light rays impinge on each of the photoconductors provided as light receiving elements, it is possible to obtain a current characteristic as shown in FIG. 12. By connecting a uniform magnetic field ammeter 2, the ammeter pointer may be made to deflect in proportion to the geometric series variation of the received light brightness (for example, light value indication). Further, since this arrangement can be applied to wide brightness range, if this arrangement is applied to an automatic exposure value setting camera, the action is effectively related to the diaphragm aperture or exposure time setting device; and when this arrangement is applied to a reading exposure meter which is a separate single light measuring device, the scale graduation can be uniformly spaced and of multi-stage system so that the reading of scale is made easy and partial accuracy change can be avoided.

The novel structure of the light receiving element to be utilized in the arrangement according to the present invention is of such electrode arrangement that over the whole light receiving face arranged on a base there are provided several light receiving bands ranging from the central portion to the peripheral portion of the face, said bands being able to receive light rays separately or selectively in several combined groups. Detailed description is given herebelow in conjunction with each of the illustrated examples.

Figure 14:
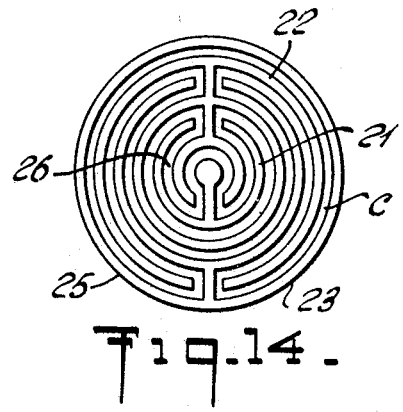
FIG. 14 is a front view of the light receiving portion of the photoconductor utilized in the arrangement of the present invention.

Referring to FIG. 14, electrodes 21, 22 and 23 are arranged on a base 25 which is, as is well known, made of quartz, ceramic, or other suitable insulating material. Between the electrodes there are provided bands of photoconductive resistors 26 composed of such photoconductive substance as cadmium sulfide, etc. The electrodes 21, 22 and 23 are of the shape of arcs of concentric circles. The electrode 21 is of ring shape which in a part cut apart and in another part connected by a band to the central electrode. The electrode 22 surrounding this electrode 21 is composed of two partially-cut-apart-ring-shaped members and a ring-shaped member therebetween, these members being connected together by a connecting member. The inner partially-cut-apart-ring-shaped portion of the electrode 22 is positioned inside the partially-cut-apart-ring-shaped portion of the electrode 21. The outermost electrode 23 consists of a ring-shaped portion and a partially-cut-apart-ring-shaped portion, which latter portion is positioned inside the outer partially-cut-apart-ring-shaped portion of the electrode 22.

In a light receiving element of such structure, the portions between electrodes 21 and 22 and between 22 and 23 act as independently separate light receiving bands. Accordingly, by making the electrode 22 a two-way terminal and changing-over this electrode to other electrodes 21 and 22, measurements may be made separately by the inner light receiving band and by the outer light receiving band so that the condition of illumination distribution or non-uniform illumination condition can be detected. Further, by connectng the two light receiving bands in series with each other with the electrode 22 acting as a two-way terminal, automatic exposure value compensation at the time of counter-light photographing can be carried out.

Figure 15:
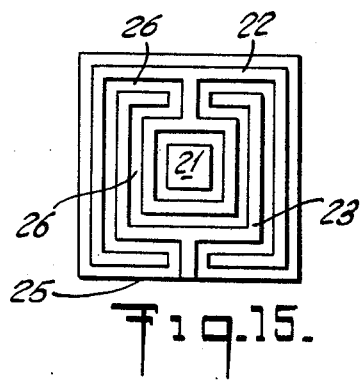
FIG. 15 is a front view showing a modified form of the light receiving portion as shown in FIG. 14, the structure being arranged in a square shape.

In FIG. 15, a square-shaped light receiving element is shown which is different from that shown in FIG. 14 only in that the electrode 21 is square-shaped, the electrode 22 consists of an enclosing-square-frame-shaped portion and squarely bent two arm portions connected to aforementioned portion, and the electrode 23 cnsists of two squarely extending arms connected together and positioned between the electrodes 21 and 22, the function and utility of this element being the same as that shown in FIG. 14.

Figure 16:
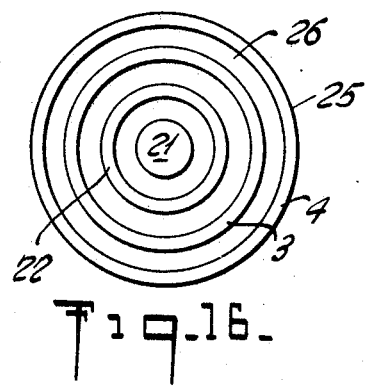
FIGS. 16 and 17 are other modified examples of the light receiving portion of the photoconductor.

In the light receiving element as shown in FIG. 16 the electrodes 21, 22, 23 and 24 are arranged in concentric circles. By attaching a lead to each of said electrodes 21, 22, 23 and 24, the resistors 26 between the mutually adjacent electrodes may be utilized as separate light receiving bands. Further, it is possible to utilize the combined whole surface of the light receiving faces inside the electrode 22, inside the electrode 23, or inside the electrode 24. According to such manner of use, the light measuring angle range can be changed as shown in FIG. 10, so that every time the lens is changed and the photographic angle is changed, accurate measurement of the average illumination within the photographing angle can be effectively performed. Further, with respect to a single photographing angle, the influence of outer harmful light rays on the accurate local illumination measurement of the object to be photographed can be detected, so that the operator can determine the most appropriate exposure condition with due consideration to elimination of such harmful influence. In FIG. 10 angles $\theta_1$, $\theta_2$ and $\theta_3$ indicate light measuring image angles corresponding to each of said light receiving bands respectively, and L indicates a condensing lens for controlling incident light rays.

Figure 17:
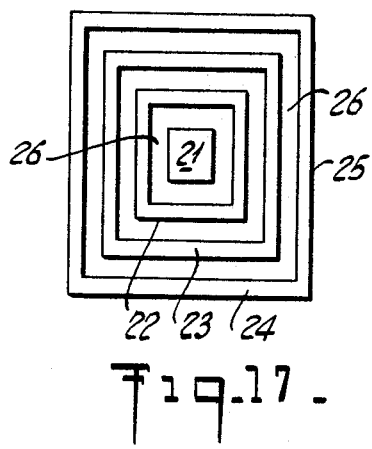

In the example as shown in FIG. 17 the structure of the element of FIG. 16 is so arranged as to have a square configuration.

In each of the illustrated light receiving elements the photoconductive resistors 26 are shown as having approximately the same width. However, it is of course not absolutely necessary to arrange the electrodes with even spacings and the spacing can be changed so as to be adapted to different purposes.

As mentioned above, according to the light measuring arrangement of the present invention, the light measurement value compensation for accurate film exposure and indication of said light measurement value in the manner of arithmetical series can be carried out. In order to reduce the indication error, the following measure is taken.

Figure 18:
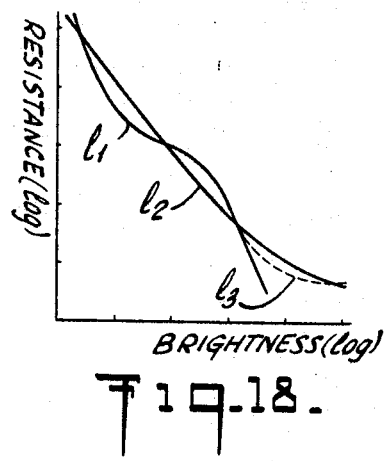
FIG. 18 is a graph showing the ideal photoconductive characteristic for arithmetical series indication of the light measuring arrangement and the general characteristic of the photoconductor of the arrangement according to the present invention.
Figure 19:
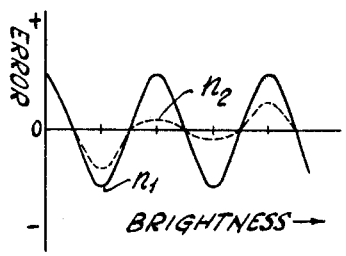
FIG. 19 is a graph showing the measured value indication error characteristic of the arrangement of the present invention.

The general characteristic of the photoconductor as utilized in the aforementioned light measuring arrangement is shown by the curve $l_1$ of FIG. 18. In this case, the error between the arithmetical series indication of the light measuring arrangement in response to the geometrical series illumination variation of the object to be photographed is indicated by the solid line $n_1$ of FIG. 19. The most important factor of the direct cause of this indication error is the photoconductive characteristic of the photoconductor. In order to obtain highly accurate light measurement indication, it is necessary to cause the photoconductive characteristic of the above light measuring arrangement to sufficiently approach the ideal characteristic curve for accurate arithmetical series indication (the solid line $l_2$ of FIG. 18). In view of the deviation in high brightness range of photoconductive characistic curve $l_1$ of the above light measuring arrangement from the ideal characteristic curve $l_2$ in FIG. 18, compensation of the high brightness range photoconductive characteristic of the light measuring arrangement is now considered.

Figure 20:
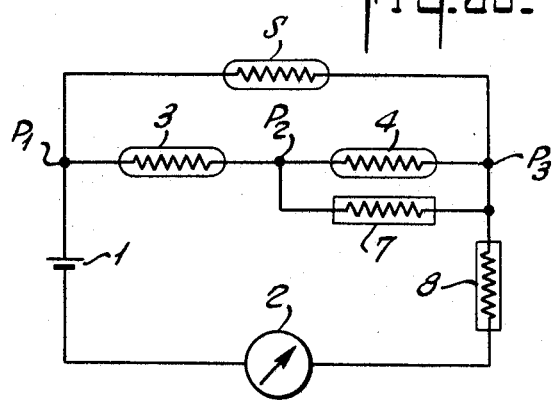
FIG. 20 is an example of the measuring circuit arrangement for reducing the indication error as far as possible.

For such purpose, a photoconductive element S which is highly responsive in high brightness range is connected in parallel with the photoconductors 3 and 4 connected in series with each other of the above light measuring arrangement, as shown in FIG. 20. With such novel arrangement, a general photoconductive characteristic curve as shown by the dotted line $l_3$ of FIG.18 is obtained, and the indication error is now shown by the curve $n_2$ of FIG. 19.

Figure 21:
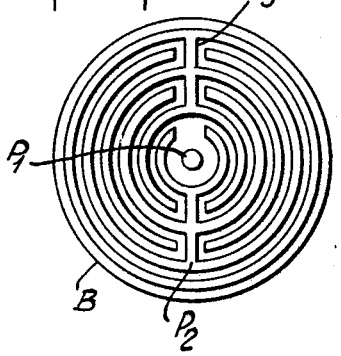
FIGS. 21, 22 and 23 show examples of the photoconductor structures to be utilized in the circuit as shown in FIG. 20.
Figure 22:
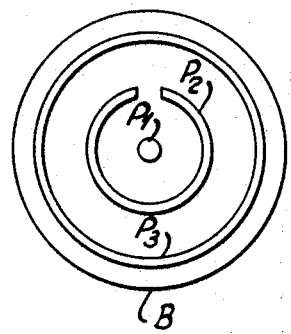
Figure 23:
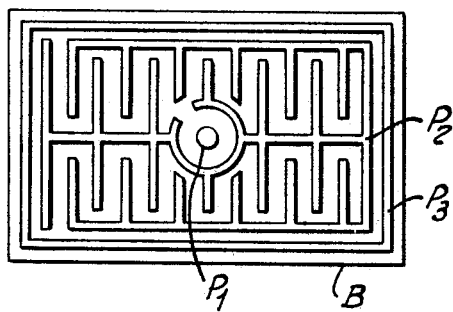

The novel structure of the light receiving photoconductive element for such error compensating circuit is as follows:

Referring to FIG. 21, in the light receiving element there are provided a point electrode $P_1$ at the center, another electrode $P_2$ surrounding the electrode $P_1$ in partially cut apart loops connected together, and still another electrode $P_2$ also surrounding the electrode $P_1$ in partially cut apart loops connected together, said electrodes $P_2$ and $P_3$ being positioned in mutually opposed relation with their arc shaped branch members arranged in mutually interposed relation. The spaces between electrodes $P_1$ and $P_2$, $P_2$ and $P_3$, and $P_3$ and $P_1$ are directly covered by a continuous band of photoconductor. In FIGS. 22 and 23 there are shown further modification of such structure. By suitably connecting the electrodes $P_1$, $P_2$ and $P_3$ of the element, the circuit shown in FIG. 20 is readily constituted and aforementioned advantage is obtained.

As mentioned above, according to the arrangement of the present invention, accurate compensation of the characteristic of and the proper function of the photoconductor is carried out. Further, by suitably changing the numbers of the connected photoconductors and of the resistors in parallel connection, different kind of compensation may also be performed. By applying different structures of the above mentioned kinds to various photoconductive elements, building-in of the elements in the arrangement can be readily performed, and manufacture of each element is carried out simultaneously and under the same condition and as a result sufficiently high measurement accuracy can be obtained by the elements placed under the same condition. Thus the arrangement of the present invention provides a great advantage.

While there have been described and illustrated preferred embodiments of the present invention it is apparent that numerous alterations, omission and additions may be made without departing from the sprit thereof.

What is claimed is:

1. A light responsive mechanism comprising an electric current sensitive device, a battery, a plurality of series connected photoconductive elements positioned in and occupying respective inner and outer sections of a predetermined sensing area and connected in series with said current sensitive device across said battery, a resistor connected in parallel with at least one of said photoconductive elements, and means for directing light from a viewed area onto said predetermined area to expose said photoconductive elements respectively to light from inner and outer sections of said viewed area.

2. The light responsive mechanism of claim 1 wherein said photoconductive elements comprise bands of photoconductive material deposited on a common base of insulating material, said photoconductive elements being delineated by spaced conductor electrodes engaging said bands along spaced points.

3. The light responsive mechanism of claim 2 wherein said photoconductive bands and said electrodes are concentrically related.

4. The light responsive mechanism of claim 1 wherein said photoconductive elements are concentrically arranged and said light directing means comprises a condensing lens disposed forward and along the central axis of said photoconductive elements.

5. The mechanism of claim 1 including first, second and third of said photoconductive elements and first and second of said resistors connected respectively in parallel with said first and second photoconductive elements.

6. The mechanism of claim 5 comprising a third resistor connected in series with said photoconductive elements and said current sensitive device across said battery.

7. The mechanism of claim 3 including first and second of said photoconductive elements connected in series, said resistor being connected in parallel with said first photoconductive element and a third photoconductive element positioned in said sensing area and connected in parallel with said series connected first and second photoconductive elements.

8. The mechanism of claim 7 including a second resistor connected in series with said first and second photoconductive elements and said current sensitive device across said battery.

References Cited

UNITED STATES PATENTS

| | | |
|---|---|---|
| 2,091,762 | 8/1937 | Kuppenbender. |
| 2,147,961 | 2/1939 | Bernhard et al. |
| 2,149,250 | 3/1939 | Bing. |
| 2,227,166 | 12/1940 | Tonnies. |
| 2,444,674 | 7/1948 | Rath. |
| 3,024,695 | 3/1962 | Nisbet. |
| 3,102,227 | 8/1963 | De Gier _____ 250—209 X |
| 3,121,170 | 2/1964 | Norwood _____ 250—209 X |
| 3,146,352 | 8/1964 | Trimble _____ 250—209 |
| 3,179,808 | 4/1965 | Grey et al. _____ 250—209 |
| 3,212,394 | 10/1965 | Norwood _____ 250—209 X |
| 3,225,646 | 12/1965 | Nagai. |

RONALD L. WIBERT, Primary Examiner

W. A. SKLAR, Assistant Examiner

U.S. Cl. X.R.

250—209; 356—226